United States Patent
Urakawa et al.

(10) Patent No.: US 7,894,114 B2
(45) Date of Patent: Feb. 22, 2011

(54) OPTICAL DEFLECTOR HAVING TAPERED APERTURE STOP, LIGHT SCANNING APPARATUS AND SCANNING TYPE IMAGE DISPLAY APPARATUS USING SAME

(75) Inventors: Takashi Urakawa, Kawasaki (JP); Keiichiro Ishihara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 84 days.

(21) Appl. No.: 11/837,480

(22) Filed: Aug. 10, 2007

(65) Prior Publication Data
US 2008/0049289 A1    Feb. 28, 2008

(30) Foreign Application Priority Data
Aug. 24, 2006   (JP) .............................. 2006-227505

(51) Int. Cl.
*G02B 26/08*    (2006.01)
(52) U.S. Cl. ................................... 359/205.1
(58) Field of Classification Search .... 359/196.1–226.3
See application file for complete search history.

(56) References Cited

U.S. PATENT DOCUMENTS

| | | | | |
|---|---|---|---|---|
| 5,467,104 | A | 11/1995 | Furness, III et al. | 345/8 |
| 5,606,447 | A | 2/1997 | Asada et al. | 359/199 |
| 6,755,042 | B2 | 6/2004 | Chuang et al. | 359/212 |
| 6,914,620 | B2 | 7/2005 | Yoshida et al. | 347/235 |
| 6,965,466 | B2 | 11/2005 | Ishihara | 359/212 |
| 7,253,827 | B2 | 8/2007 | Ishihara | 347/235 |
| 7,256,917 | B2 | 8/2007 | Ishihara | 359/207 |
| 2003/0053156 | A1* | 3/2003 | Satoh et al. | 358/511 |
| 2003/0227538 | A1* | 12/2003 | Fujii et al. | 347/260 |
| 2006/0209384 | A1* | 9/2006 | Chui et al. | 359/290 |
| 2007/0132829 | A1 | 6/2007 | Ishihara | 347/233 |
| 2007/0153351 | A1* | 7/2007 | Choa et al. | 359/224 |
| 2008/0049095 | A1 | 2/2008 | Ishihara et al. | 347/247 |

FOREIGN PATENT DOCUMENTS

| | | |
|---|---|---|
| JP | 7-175005 | 7/1995 |
| JP | 8-334723 | 12/1996 |

* cited by examiner

*Primary Examiner*—Stephone B Allen
*Assistant Examiner*—Jennifer L Doak
(74) *Attorney, Agent, or Firm*—Fitzpatrick, Cella, Harper & Scinto

(57) ABSTRACT

An optical deflector is disclosed which is capable of preventing unnecessary reflection by a member disposed behind a reflecting portion. The optical deflector includes a substrate portion, a reflecting portion can swing about a swinging motion axis with respect to the substrate portion, and an aperture stop portion which includes an aperture and blocks at least part of a light beam other than a light beam entering the aperture among an incident luminous flux to the optical deflector. The aperture allows passage of the incident luminous flux toward the reflecting portion and that of an emergent luminous flux reflected by the reflecting portion. At least part of an aperture rim of the aperture stop portion has a shape that makes the width of the aperture narrower from a light-beam-incoming side toward a reflecting portion side.

7 Claims, 16 Drawing Sheets

(W/2)cosB+{L+(W/2)sinB}tanA (W/2)cosB+{L+(W/2)sinB}tan(A+2B)

PRIOR ART

PRIOR ART

OPTICAL DEFLECTOR HAVING TAPERED APERTURE STOP, LIGHT SCANNING APPARATUS AND SCANNING TYPE IMAGE DISPLAY APPARATUS USING SAME

BACKGROUND OF THE INVENTION

The present invention relates to an optical deflector which reflects and deflects a light beam, and to a light scanning apparatus and a scanning type image display apparatus which use the same.

An optical deflector is a device changing a reflecting direction of a light beam from a light source. Scanning the light beam with the optical deflector can form an image. Light scanning apparatuses and scanning type image display apparatuses using such an optical deflector have been proposed in, for example, U.S. Pat. No. 5,467,104.

A micro mechanical system (Micro Electro-Mechanical System: MEMS) produced by semiconductor production processes is often used as the optical deflector (scanning device) as disclosed in Japanese Patent Laid-Open Nos. 7-175005 and 8-334723.

The optical deflector generally has a substrate portion and a reflecting surface (a mirror surface or a reflecting portion) supported thereby via torsion bars. The reflecting surface swing by an electromagnetic force or an electrostatic force provided from an actuator with the torsion bars being twisted. Such an optical deflector is extremely small and can operate fast.

In such an optical deflector, a larger reflecting surface than a diameter of the light beam entering the optical deflector can receive the entire light beam even when there is a positional error between the light beam and the reflecting surface. On the other hand, a large reflecting surface causes deterioration of mechanical characteristics of the optical deflector and increase of power consumption. It is therefore desirable that the reflecting surface be as small as possible.

As shown in FIG. 15, when a reflecting surface 1501 is smaller than the diameter of an incident luminous flux 1502, some of the light beam 1502 does not impinge on the reflecting surface 1501 and is reflected by a member disposed behind the reflecting surface 1501. Such unnecessary reflected light forms flare on a displayed image, which deteriorates quality of the image. Accordingly, it is desirable that the size of the reflecting surface be the same as the diameter of the light beam impinging thereon.

However, in a case where the size of the reflecting surface is the same as the diameter of the light beam, an incorrect (shifted) positional relationship between the light beam and the reflecting surface due to component tolerance and assembly error causes some of the light beam which does not impinge on the reflecting surface to reflect by the member disposed behind the reflecting surface, as is the case where the reflecting surface is smaller than the diameter of the light beam. Therefore, flare is generated.

On the other hand, in general, the diameter of the light beam entering the optical deflector is narrowed down by an aperture stop portion 1604 for beam shaping, the aperture stop portion 1604 being provided in a light source unit 1605 including a light source 1603. In order to cause the light beam 1606 shaped by the aperture of the aperture stop portion 1604 to impinge on the reflecting surface 1602 of the optical deflector 1601, high positional accuracy is required between the light source unit 1605 and the reflecting surface 1602.

In addition, when the distance from the light source 1603 to the optical deflector 1601 is long, diffraction may be caused by an aperture rim of the aperture stop portion 1604. That is, the diameter of the light beam 1606 reaching the optical deflector 1601 is larger than that of the light beam 1606 immediately after passing through the aperture stop portion 1604, which results in increase of the light beam that does not impinge on the reflecting surface 1602, and thereby the above-described unnecessary light component increases.

BRIEF SUMMARY OF THE INVENTION

The present invention provides an optical deflector capable of preventing unnecessary reflection by a member disposed behind the reflecting portion even when the diameter of the incident luminous flux is larger than the reflecting portion or there is a displacement between the reflecting portion and the incident luminous flux. Further, the present invention provides a light scanning apparatus and a scanning type image display apparatus, each of which can form an image with good quality by using the optical deflector.

An optical deflector according to one aspect of the present invention includes a substrate portion, a reflecting portion can swing about a swinging motion axis with respect to the substrate portion, and an aperture stop portion which includes an aperture and blocks at least part of a light beam other than a light beam entering the aperture among an incident luminous flux to the optical deflector. The aperture allows passage of the light beam entering toward the reflecting portion and that of an emergent luminous flux reflected by the reflecting portion. At least part of an aperture rim of the aperture stop portion has a shape that makes the width of the aperture narrower from a light-beam-incoming side toward a reflecting portion side.

A light scanning apparatus and a scanning type image display apparatus according to other aspects of the present invention include a light source and the above-described optical deflector.

A image display system according to still another aspect of the present invention includes the scanning type image display apparatus and an image supply apparatus.

Other objects and features of the present invention will become apparent from the following description and the attached drawings.

DETAILED DESCRIPTION OF THE PREFERRED EMBODIMENTS

Preferred embodiments of the present invention will hereinafter be described with reference to the accompanying drawings.

Embodiment 1

Figure 1:
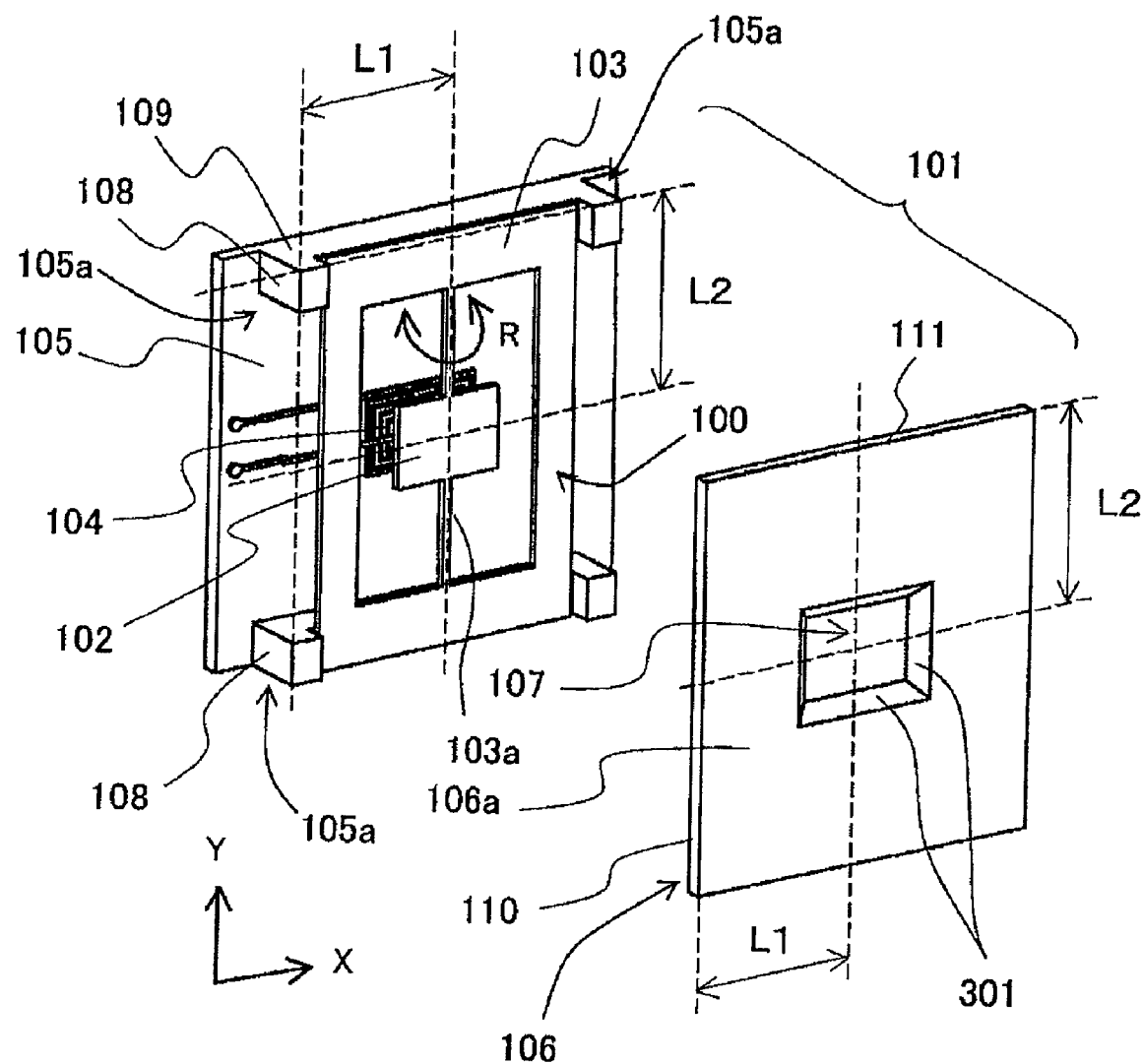
FIG. 1 is an exploded perspective view showing an optical deflector, which is Embodiment 1 of the present invention.

FIG. 1 shows the configuration of an optical deflector which is Embodiment 1 of the present invention. The following description will be made of a case where the optical deflector is used for a light scanning apparatus that is a main constituent of a scanning type image display apparatus, described later, and is an apparatus that forms (or displays) an image with a light beam scanned by the optical deflector.

FIG. 1 shows a state in which an aperture stop plate (aperture stop member or aperture stop portion) 106 is separated from a MEMS mirror of the optical deflector 101.

The optical deflector 101 includes a MEMS mirror 100. The MEMS mirror 100 includes a substrate (substrate portion) 103 and a reflecting surface (reflecting portion) 102 which is supported by torsion bars 103a. The substrate 103, torsion bars 103a and reflecting surface 102 are integrally formed by semiconductor production processes.

MEMS mirror 100 includes a coil 104 for reciprocally swinging the reflecting mirror 102 about the torsion bars 103a (swinging motion axis) with respect to the substrate 103. An alternating signal applied to the coil 104 changes an electromagnetic force acting between the coil 104 and an unshown magnet disposed on the back side of the reflecting surface 102, thereby swinging the reflecting surface 102 in a direction shown by an arrow R in the figure.

The MEMS mirror 100 is supported by four supporting portions 105a formed on a supporting base 105 and having a protruding shape. The aperture stop plate 106 is disposed on the front side of the MEMS mirror 100, the aperture stop plate 106 blocking a light beam impinging on an area other than the reflecting surface 102. The front side means a light-beam-incoming side on which a light beam is incoming to the optical deflector 101. The aperture stop plate 106 is attached to the front ends of the supporting portions 105a.

The aperture stop plate 106 has a rectangular aperture 107 formed therein, the aperture 107 allowing passage of a light beam entering toward the reflecting surface 102 among the incident luminous flux to the optical deflector 101 and that of an emergent luminous flux reflected by the reflecting surface 102. The aperture 107 faces the reflecting surface 102 in a neutral static state, described later.

Next, description will be made of an alignment between the center of the reflecting surface 102 and the center of the aperture 107 formed in the aperture stop plate 106.

The substrate 103 (that is, the MEMS mirror 100) is attached to the supporting portions 105a such that the distance from reference surfaces 108 that are first side faces of two supporting portions 105a (supporting base 105) to the center of the reflecting surface in an X-direction is L1.

Further, the substrate 103 is attached to the supporting portions 105a such that the distance from a reference surface 109 that is a second side face of supporting base 105 (two supporting portions 105a) to the center of the reflecting surface in a Y-direction is L2.

The aperture stop plate 106 is formed such that the center of the aperture 107 is located at a distance of L1 from a reference surface 110 that is a first side face of the aperture stop plate 106 in the X-direction and at a distance of L2 from a reference surface 111 that is a second side face of the aperture stop plate 106 in the Y-direction.

Coinciding the reference surfaces 108 of the supporting base 105 with the reference surface 110 of the aperture stop plate 106 and coinciding the reference surface 109 of the supporting base 105 with the reference surface 111 of the aperture stop plate 106 make it possible to accurately align the centers of the reflecting surface 102 and the aperture 107.

The reference surfaces in the supporting base 105 and aperture stop plate 106 may be provided on surfaces other than those described above. The shapes of portions provided with the reference surfaces may be differed from those described above. Further, other configurations can be employed for the alignment between the centers of the reflecting surface 102 and the aperture 107.

Figure 2:
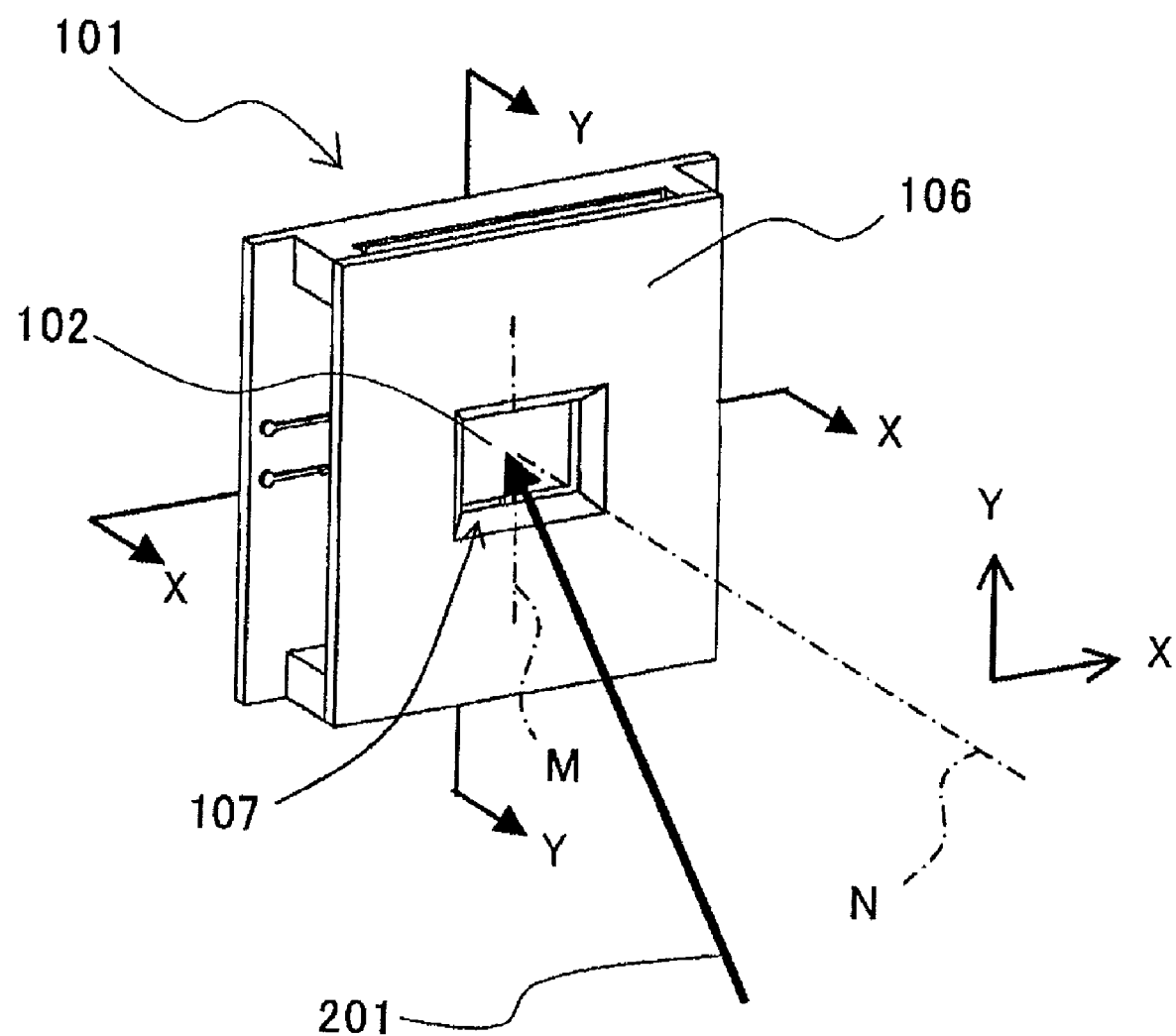
FIG. 2 is a perspective view showing the optical deflector of Embodiment 1, which is in an assembly-completed state.

FIG. 2 shows a state in which a light beam (incident luminous flux) 201 enters the optical deflector 101 completely assembled as above.

The coincidence of the centers of the aperture 107 and reflecting surface 102 enables cutting-out of a necessary light beam (part of the incident luminous flux 201) by the aperture 107 and introduction thereof to the reflecting surface 102 even when the positional relationship between the optical deflector 101 and an unshown light source emitting the incident luminous flux 201 is shifted. This allows relaxation of positional tolerance between the light source and the reflecting surface 102 when the optical deflector 101 is installed into the light scanning apparatus.

FIG. 2 shows a state in which the reflecting surface 102 of the optical deflector 101 is located at a neutral position where it faces right front, that is, a neutral static state in which the reflecting surface 102 does not swing from the neutral position.

In this neutral static state, in a plane including a normal N to the center of the reflecting surface 102 and a swinging motion axis M (Y-axis) of the reflecting surface 102, part of the incident luminous flux (hereinafter simply referred to also as the incident luminous flux) 201 from the light source impinges on the reflecting surface 102, from a direction that forms a certain angle with the normal N. The normal N to the center of the reflecting surface 102 in the neutral static state is hereinafter merely referred to as the normal to the reflecting surface 102. The normal N corresponds to a central axis of the aperture 107.

Figure 3:
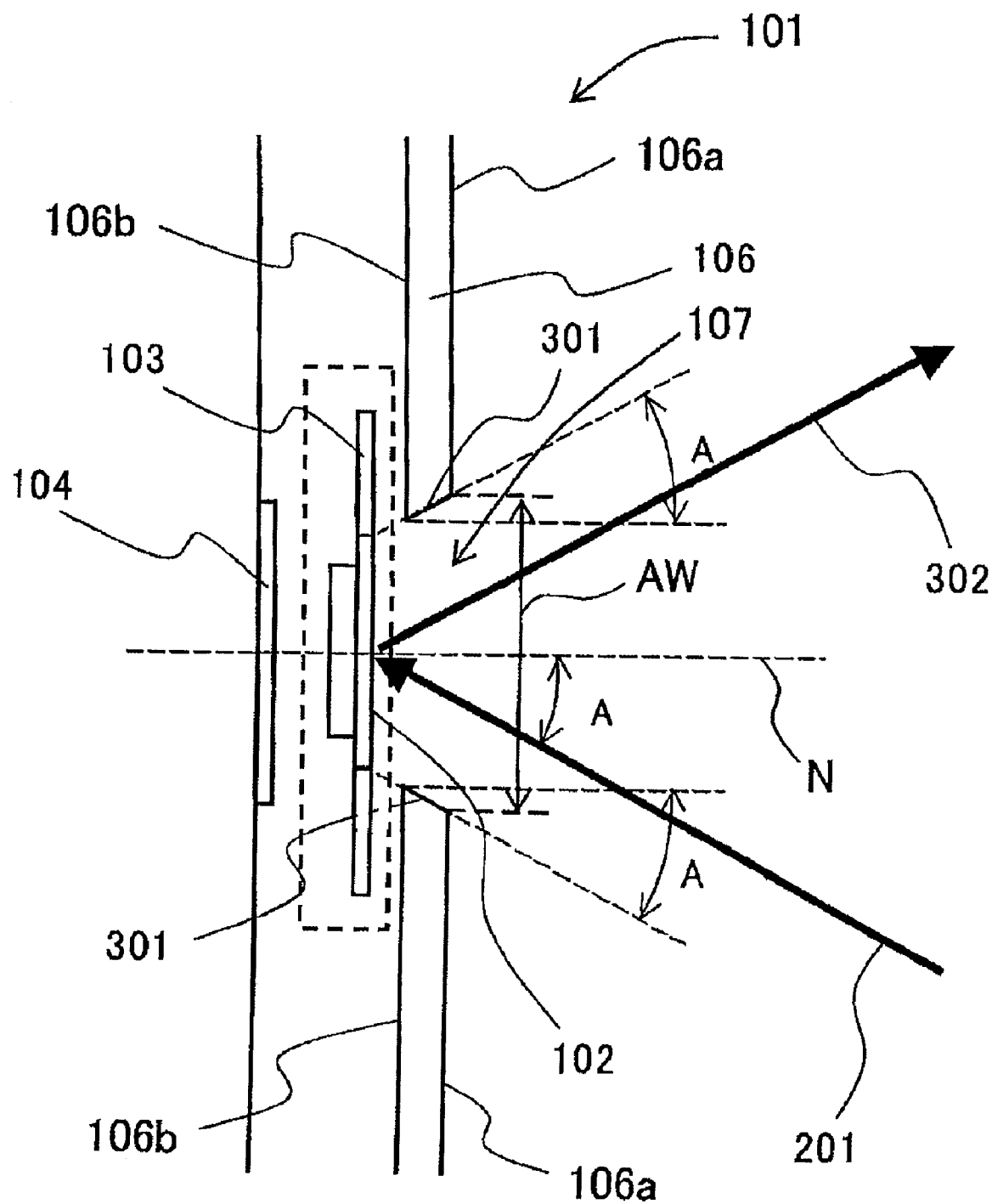
FIGS. 3 and 4A are sectional views showing the optical deflector of Embodiment 1, which is in a neutral static state.

FIG. 3 shows a cross-section of the optical deflector 101 in the neutral static state shown in FIG. 2, the cross-section being along a Y-Y line passing through the center of the reflecting surface 102 and parallel to the swinging motion axis M.

The aperture stop plate 106 has, in its thickness direction, a surface (reflecting-surface-side surface or reflecting-portion-side surface) 106b closer to the reflecting surface 102 and a surface (light-beam-incoming-side surface) 106a farther from the reflecting surface 102, that is, a surface on the side where the incident luminous flux 201 impinges thereon. The light-beam-incoming-side surface 106a is hereinafter referred to as the front surface 106a.

The rim (aperture rim) 301 of the aperture 107 of the aperture stop plate 106 is formed in a tapered shape which makes the width (aperture width) AW of the aperture 107 gradually narrower from the side of the front surface 106a toward the side of the reflecting-surface-side surface 106b. The aperture rim 301 is hereinafter referred to as the tapered portion 301.

The tapered portion 301 inclines so as to form a taper angle equal to or larger than an angle A with the normal N. The angle A is an incident angle of the incident luminous flux 201 onto the reflecting surface 102 in the neutral static state.

In this embodiment, the aperture rim is formed in a rectangular frame shape, so that four tapered portions 301 corresponding to four sides of the rectangular frame have the same taper angle. However, the tapered portions may have different angles from each other.

In this embodiment, in the neutral static state, the incident luminous flux 201 impinges on the reflecting surface 102 at an incident angle of 28 degrees (=A). Therefore, the tapered portion 301 having a taper angle equal to or larger than 28 degrees can prevent the tapered portion 301 from blocking the optical paths of the incident luminous flux 201 entering toward the reflecting surface 102 and a reflected light beam (emergent luminous flux) 302 that is reflected and then exits from the optical deflector 101.

More specifically, when the incident luminous flux 201 is not a parallel light beam but a converging light beam, providing a taper angle to the tapered portion 301 in consideration of the convergent angle of the incident luminous flux 201 can reduce a light beam component blocked by the tapered portion 301 and thereby prevent reduction of light use efficiency.

In this embodiment, the maximum swinging motion angle (maximum mechanical incline angle) of the reflecting surface 102 is set to 10 degrees, and therefore the exit angle of the light beam 302 reflected by the reflecting surface 102 is 20 degrees in the X-direction. That is, the incident angle of the incident luminous flux 201 onto the reflecting surface 102 is larger than the exit angle. Accordingly, it is necessary that the taper angle of the tapered portion 301 in the X-direction be equal to or larger than 20 degrees that is the incident angle.

However, when the exit angle of the reflected light beam 302 is larger than the incident angle of the incident luminous flux 201 in the X-direction, it is necessary that the taper angle provided to the tapered portion 301 in the X-direction be equal to or larger than the exit angle of the reflected light beam 302 in that direction.

Figure 4A:
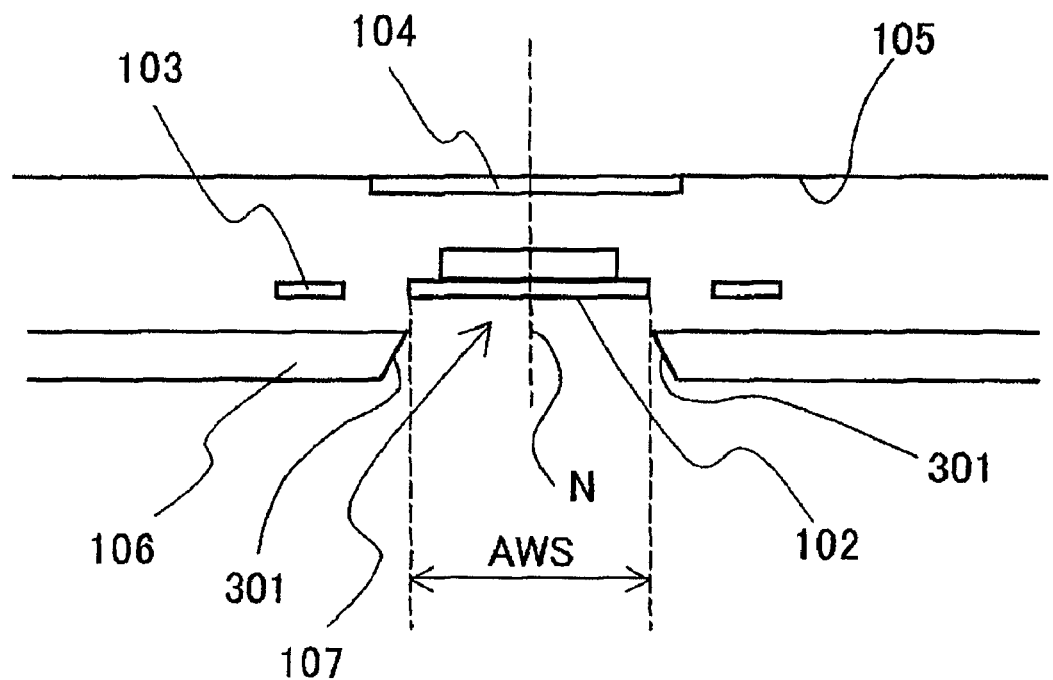
Figure 4B:
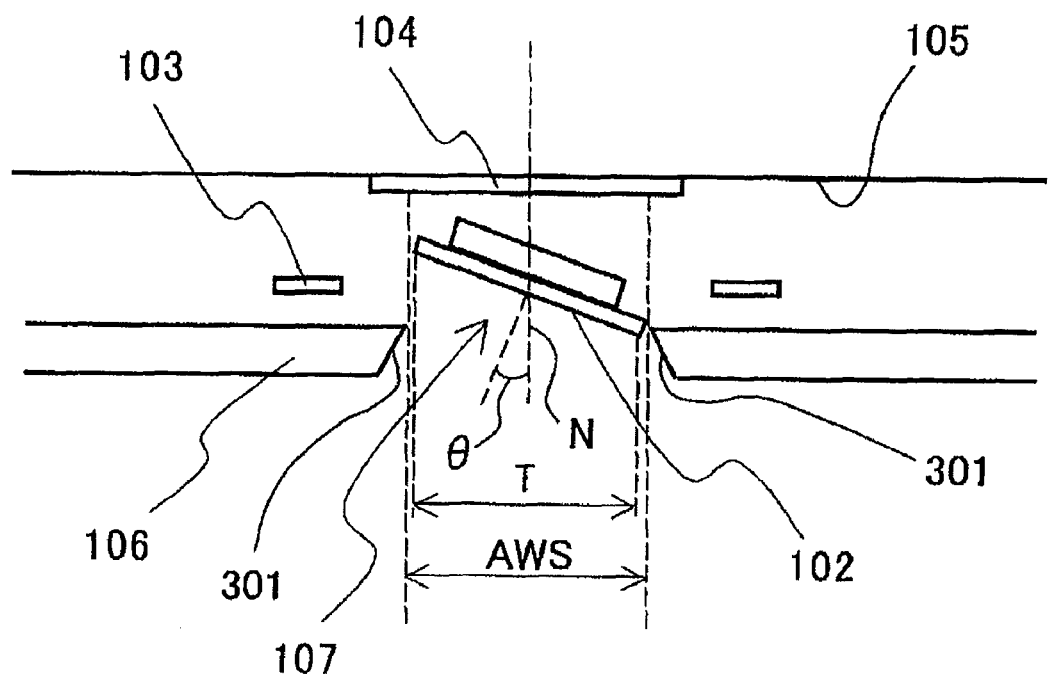
FIG. 4B is a sectional view showing the optical deflector of Embodiment 1, which is in a maximum swung state.

Next, description will be made of the size of the aperture 107 formed in the aperture stop plate 106. FIG. 4A shows a cross-section of the optical deflector 101 in the neutral static state shown in FIG. 2, the cross-section being along an X-X line passing through the center of the reflecting surface 102 and orthogonal to the swinging motion axis M of and the normal N to the reflecting surface 102. FIG. 4B shows a cross-section of the optical deflector 101 in a state in which the reflecting surface 102 is swung to the maximum swinging motion angle (the state is hereinafter referred to as the maximum swung state).

In this embodiment, as shown in FIG. 4A, in the neutral static state of the reflecting surface 102, the minimum width (hereinafter referred to as the minimum aperture width) AWS of the aperture widths between the tapered portions 301 opposite to each other coincides with the width of the reflecting surface 102 in the direction of the minimum aperture width AWS. Therefore, the light beam passing through the aperture 107 can be reflected by the reflecting surface 102 in the neutral static state, thereby enabling prevention of reduction of light use efficiency.

When a mechanical swinging motion angle of the reflecting surface 102 in the maximum swung state shown in FIG. 4B is represented by θ, the width (hereinafter referred to as the orthogonal projection width) T of the reflecting surface 102 when viewed from the direction of the normal N is AWS cos θ, which is smaller than AWS. Thus, part (leakage light component) of the incident luminous flux 201 passing through the aperture 107 does not impinge on the reflecting surface 102 and is reflected by the coil 104 and the supporting base 105 which are disposed behind the reflecting surface 102.

The amount of the leakage light component depends on the width and mechanical swinging motion angle of the reflecting surface 102. For example, when the width of the reflecting surface 102 in a direction (X-direction) orthogonal to the swinging motion axis M of the reflecting surface 102 is 1.5 mm which is same as the minimum aperture width AWS of the aperture 107, the orthogonal projection width T of the reflecting surface 102 is 1.48 mm in the maximum swung state in which the mechanical swinging motion angle is 10 degrees.

This embodiment does not question the leakage light component having a width of 10 μm on one side in view of image formation because such a leakage light component can be regarded as not generating any noticeable flare. Therefore, the above setting can achieve an optical deflector having substantially no problem caused by the leakage light component.

To reduce the leakage light component, it is preferable that the minimum aperture width formed by the tapered portions 301 coincide with the orthogonal projection width of the reflecting surface 102 in the maximum swung state.

Figure 5:
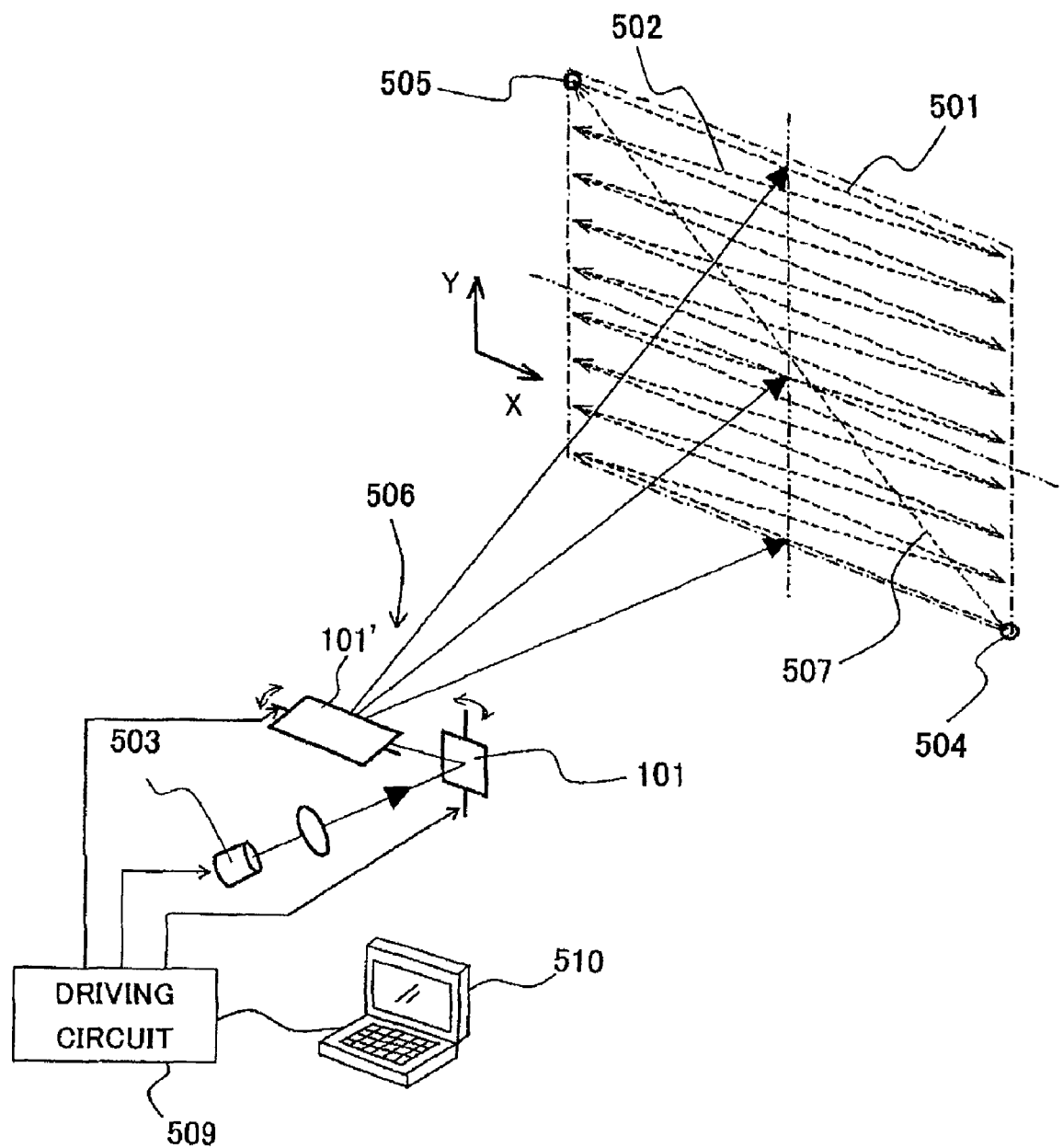
FIG. 5 is a schematic view showing a light scanning apparatus and a scanning type image display apparatus, which use the optical deflector of Embodiment 1.

FIG. 5 shows the configuration of a light scanning apparatus using the optical deflector 101 of the present embodiment. This light scanning apparatus is used as an image drawing system of a scanning type image display apparatus which two-dimensionally scans the emergent luminous flux from the optical deflector 101 on an unshown screen (scanned surface).

A light beam emitted from a light source 503 such as a semiconductor laser is introduced to a screen through a scanning unit 506 constituted by a first optical deflector 101 and a second optical deflector 101'. The first and second optical deflector 101 and 101' have the same configuration as that of the above-described optical deflector 101. The first optical deflector 101 scans the light beam from the light source 503 in a horizontal direction (X-direction), and the second optical deflector 101' scans the light beam from the first optical deflector 101 in a vertical direction (Y-direction).

In FIG. 5, lines 501 and 502 show to-and-fro paths of a horizontal scanning line, which are formed by operation of the first optical deflector 101. The number of the actual horizontal scanning lines is larger than in the figure. A line 507 shows a flyback line returning to a scan-starting point 505 by operation of the second optical deflector 101' after the horizontal scanning line 501 reaches a scan-ending point 504 in the vertical direction. The repetition cycle of the vertical scanning determines a frame rate for image display.

Using such two optical deflectors 101 and 101' enables a two-dimensional raster scanning on the screen. The first and second optical deflectors 101 and 101' are synchronously controlled to perform such a raster scanning of the light beam from the light source 503. Further, modulation of the light source 503 in synchronization with the operations of the first and second optical deflectors 101 and 101' enables displaying images.

The light source 503 and the optical deflectors 101 and 101' are connected to a driving circuit 509, which receives image information (image signal) from an image supply apparatus 510 such as a personal computer, a DVD player or a television tuner. The driving circuit 509 controls the light source 503 and the optical deflectors 101 and 101' such that an image corresponding to the received image information is displayed on the screen.

An image display system is constituted by the scanning type image display apparatus and the image (image information) supply apparatus 510.

Other configurations of the scanning type image display apparatus may be employed in alternative embodiments of the present invention. For example, a single optical deflector may be used which is capable of two-dimensionally scanning a light beam instead of the two optical deflectors each one-dimensionally scanning a light beam, which are shown in FIG. 5. Further, a combination of an optical deflector and a galvanometer mirror each one-dimensionally scanning a light beam may be used for two-dimensional scanning.

As described above, according to this embodiment, providing the aperture stop plate 106 in the optical deflector 101 enables facile positioning (without need of an extremely high accuracy) of the incident luminous flux 201 entering toward the reflecting surface 102 and the reflecting surface 102. Further, an adjacent arrangement of the reflecting surface 102 and aperture stop plate 106 can make the sizes of the aperture 107 in the aperture stop plate 106 and the reflecting surface 102 nearly equal to each other.

This can prevent generation of a large amount of the unnecessary light component (leakage light component) that passes through the aperture 107 but does not impinge on the reflecting surface 102, thereby enabling prevention of generation of flare on a displayed image. In addition, the aperture 107 of the aperture stop plate 106 can shape the divergent light beam entering from the light source side and impinging on the reflecting surface 102 into a desired shape having a desired cross-sectional size.

Furthermore, in this embodiment, the aperture rim of the aperture stop plate 106 has the tapered shape which makes the aperture width narrower as closer to the reflecting surface 102. This can suppress the incident luminous flux and emergent luminous flux from being blocked by the aperture rim, thereby enabling prevention of reduction of light use efficiency.

Embodiment 2

Figure 6:
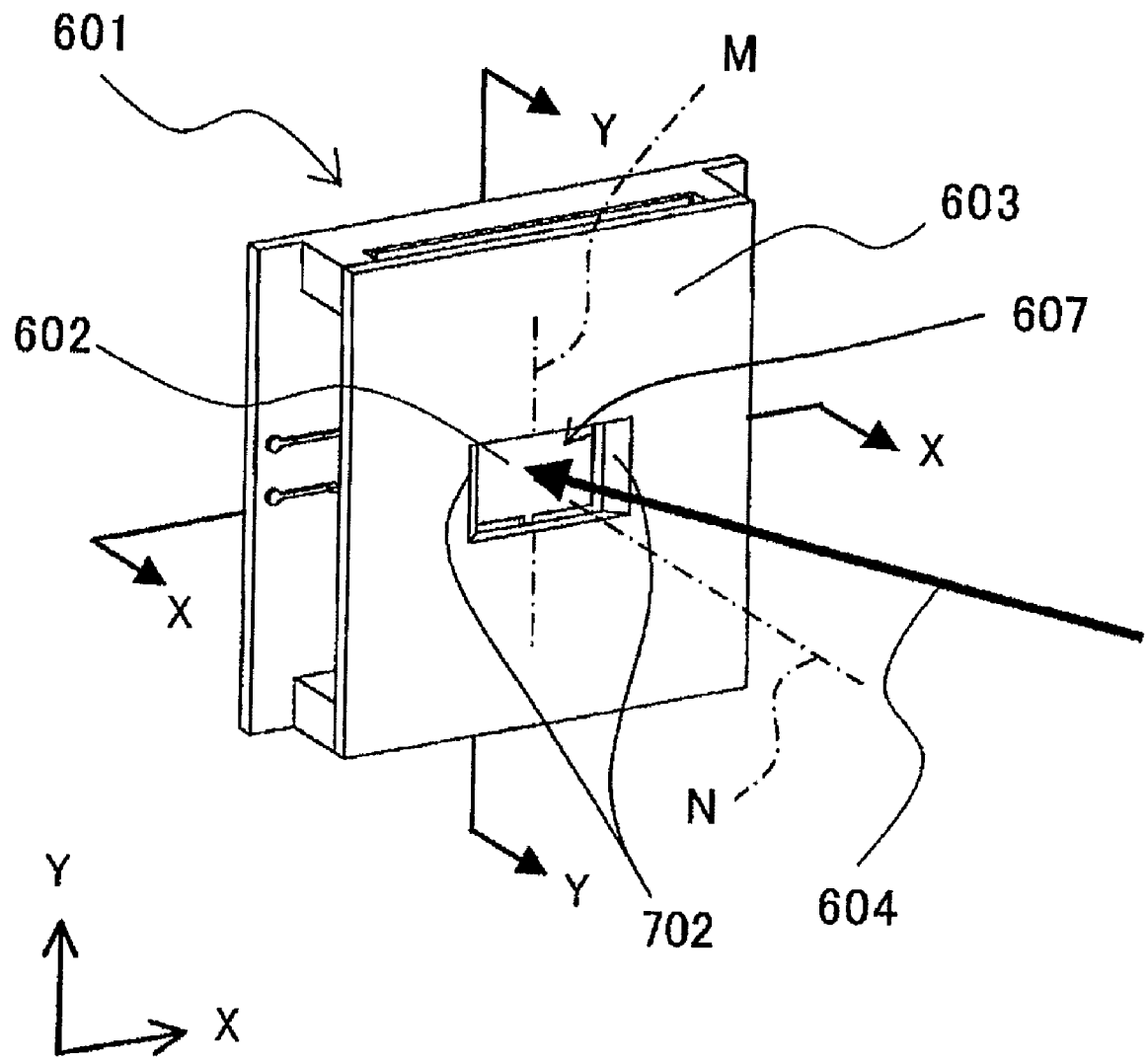
FIG. 6 is a perspective view showing an optical deflector which is Embodiment 2 of the present invention.

FIG. 6 shows an optical deflector, which is Embodiment 2 of the present invention. The configuration of the optical deflector 601 of this embodiment is basically the same as that of Embodiment 1. However, the optical deflector 601 of this embodiment is different in the shapes of an aperture 607 and an aperture rim 702 of an aperture stop plate 603 from those of Embodiment 1. Therefore, description in this embodiment will be mainly made of the shape of the aperture stop plate 603.

FIG. 6 shows a state in which a light beam 604 enters the optical deflector 601 whose reflecting surface 602 is in the neutral static state. In this embodiment, in a plane orthogonal to a plane including a normal N to the reflecting surface 602 and a swinging motion axis M (Y-axis) of the reflecting surface 602, the incident luminous flux 604 from an unshown light source impinges on the reflecting surface 602 in the neutral static state, from a direction that forms a certain angle with the normal N.

Using FIGS. 7A and 7B, description will be made of the shape of the aperture stop plate 603, which increases light use efficiency.

Each of these figures shows a cross-section of the optical deflector 601 shown in FIG. 6 (however, the state of the reflecting surface 602 is different from that in FIG. 6), the cross-section being along an X-X line passing through the center of the reflecting surface 602 and orthogonal to the swinging motion axis M of and the normal N to the reflecting surface 602. In FIG. 7A the reflecting surface 602 is swung to a maximum swung state on the side where the incident angle of the light beam 604 onto the reflecting surface 602 becomes smaller (hereinafter referred to as an light-beam-incoming side), and in FIG. 7B the reflecting surface 602 is swung to a maximum swung state on the opposite side to the light-beam-incoming side.

Figure 7A:
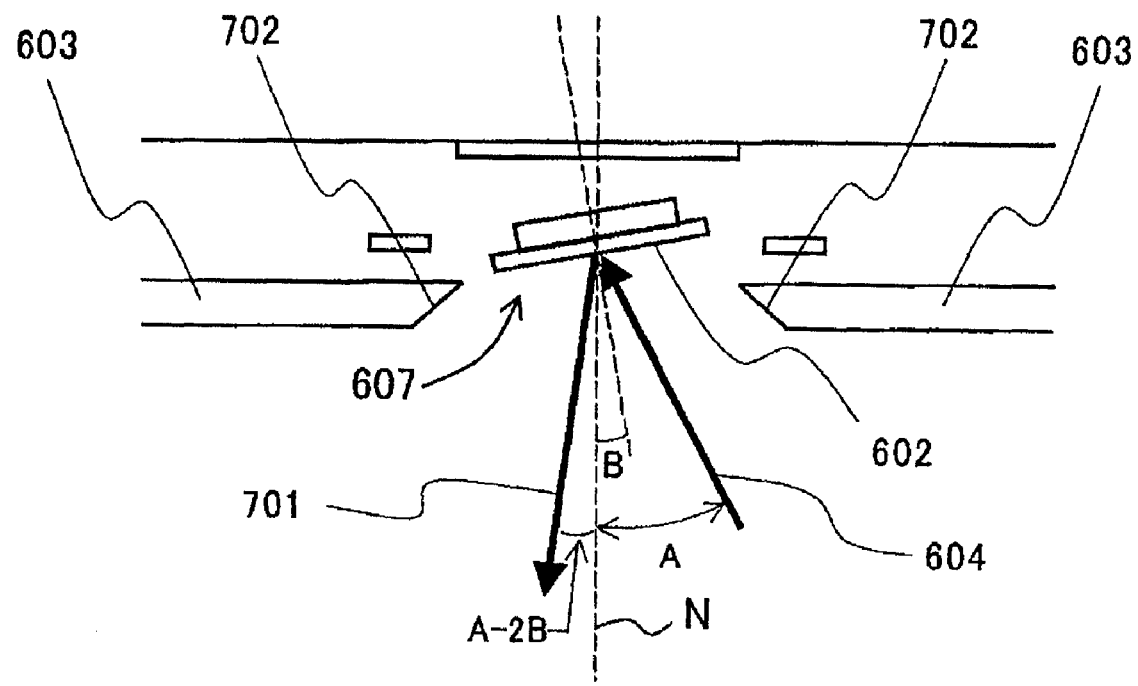
FIGS. 7A, 7B, 8A, 8B, 9A and 9B are sectional views showing the optical deflector of Embodiment 2, which is in a maximum swung state.
Figure 7B:
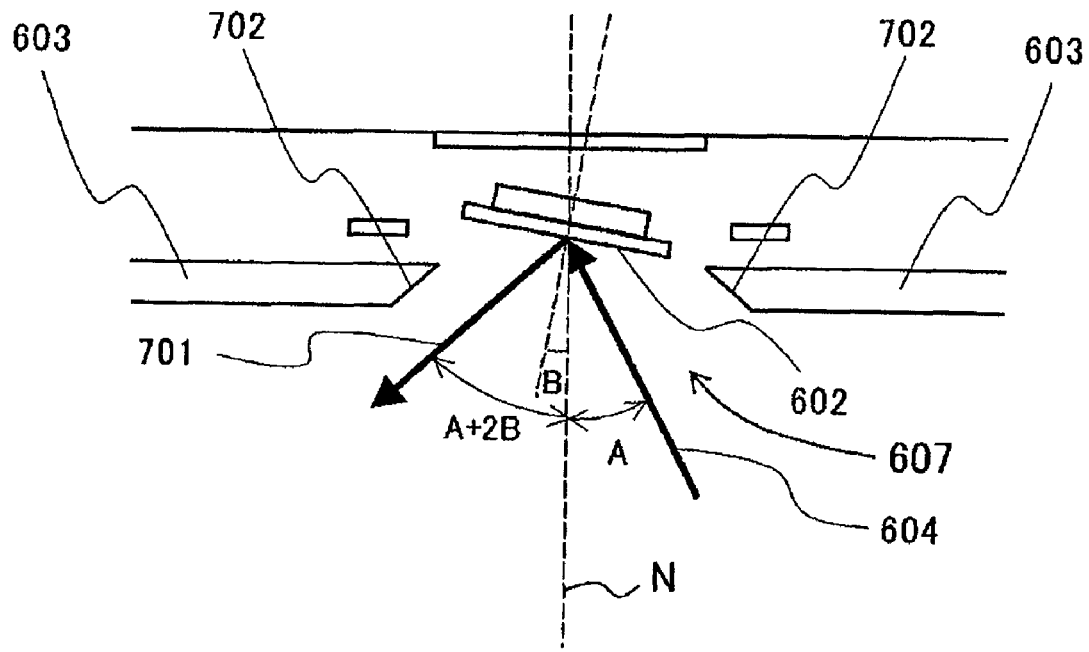

The incident angle of the light beam 604 onto the reflecting surface 602 (angle forming with the normal N) in FIGS. 7A and 7B is defined as A, and the mechanical swinging motion angle of the reflecting surface 602 is defined as B (however, the directions thereof are different from each other).

In the state shown in FIG. 7A, the actual incident angle of the light beam 604 onto the reflecting surface 602 is (A−B), and therefore a light beam 701 is reflected by the reflecting surface 602 at an angle of (A−2B) with respect to the normal N. In the state shown in FIG. 7B, the actual incident angle of the light beam 604 onto the reflecting surface 602 is (A+B), and therefore the light beam (emergent luminous flux) 701 is reflected by the reflecting surface 602 at an angle of (A+2B) with respect to the normal N.

According to this, providing a taper angle of (A+2B), which corresponds to the larger reflecting angle, to tapered portions 702 in the aperture rim of the aperture stop plate 603 with respect to the normal N to the reflecting surface 602 can achieve a configuration which does not block the entrance and exit of the light beam with respect to the reflecting surface 602.

In this embodiment, tapered portions are not provided to the aperture rim in the Y-direction of the aperture 607 because the incident luminous flux 604 comes from the swinging motion direction of the reflecting surface 602. Thus, it is not necessarily needed to provide the tapered potion 702 over the entire aperture rim, that is, it is only necessary to provide the tapered potion 702 at part of the aperture rim which may block the light beam.

Figure 8A:
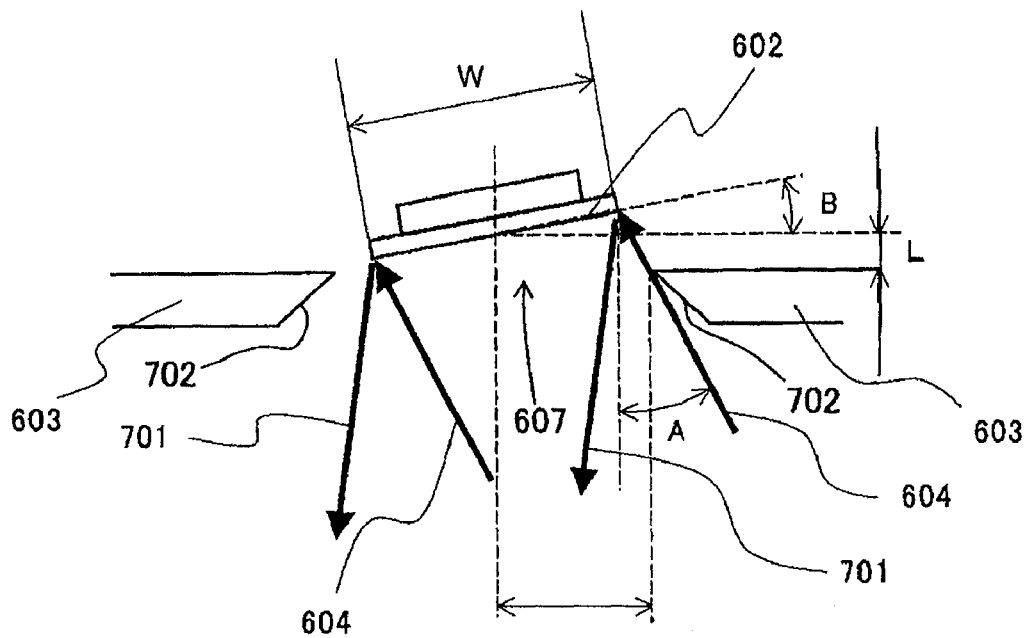
Figure 8B:
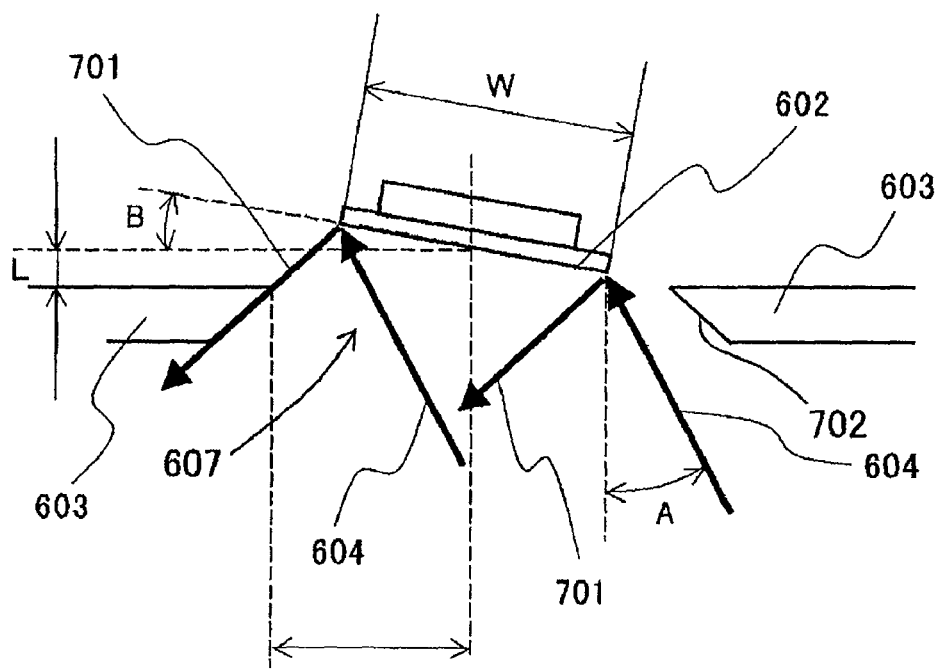

Next, description will be made of the size of the aperture 607 of the aperture stop plate 603 (that is, the minimum aperture width formed by the tapered portions 702). FIG. 8A shows the maximum swung state of the reflecting surface 602 on the light-beam-incoming side, and FIG. 8B shows the maximum swung state of the reflecting surface 602 on the opposite side.

The width of the reflecting surface 602 is defined as W, and the distance from the reflecting surface 602 to the reflecting-surface (portion)-side surface of the aperture stop plate 603 is defined as L. In the state of FIG. 8A, the width (a half of the minimum aperture width) from the center of the aperture 607 to the reflecting-surface-side end of the tapered portion 702 for preventing the incident luminous flux 604 to the reflecting surface 602 and the reflected light beam (emergent luminous flux) 701 therefrom from being blocked by the aperture stop plate 603 is as follows:

$$(W/2)\cos B + \{L + (W/2)\sin B\} \tan A \quad (1).$$

On the other hand, in the state of FIG. 8B, the width (a half of the minimum aperture width) from the center of the aperture 607 to the reflecting-surface-side end of the tapered portion 702 for preventing the incident luminous flux 604 to the reflecting surface 602 and the reflected light beam (emergent luminous flux) 701 therefrom from being blocked by the aperture stop plate 603 is as follows:

$$(W/2)\cos B + \{L+(W/2)\sin B\} \tan(A+2B) \quad (2).$$

According to these expressions, in order to prevent the necessary light beams from being blocked by the aperture stop plate 603, it is preferable that the minimum aperture width of the aperture 607 formed by the tapered portions 702 be twice the value given by the expression (2), which is larger than the value given by the expression (1).

For example, assume that the incident luminous flux 604 impinges on the reflecting surface 602 at an incident angle of 28 degrees with respect to the normal N to the reflecting surface 602. Further, assume that the distance L from the reflecting surface 602 to the reflecting-surface-side surface of the aperture stop plate 603 is 0.2 mm, which is a distance for preventing the swinging reflecting surface 602 from contacting the aperture stop plate 603 when there is a positional error between the MEMS mirror and the aperture stop plate 603.

In addition, other values are the same as those in Embodiment 1; the width of the reflecting surface 602 in a direction orthogonal to the swinging motion axis M is 1.5 mm, and the maximum mechanical incline angle of the reflecting surface 602 is 10 degrees.

In this case, the tapered portion 702 having a taper angle of 48 degrees and the aperture 607 having a minimum aperture width of 2.21 mm can achieve a configuration which prevents the optical paths of the necessary light beams from being blocked.

Figure 9A:
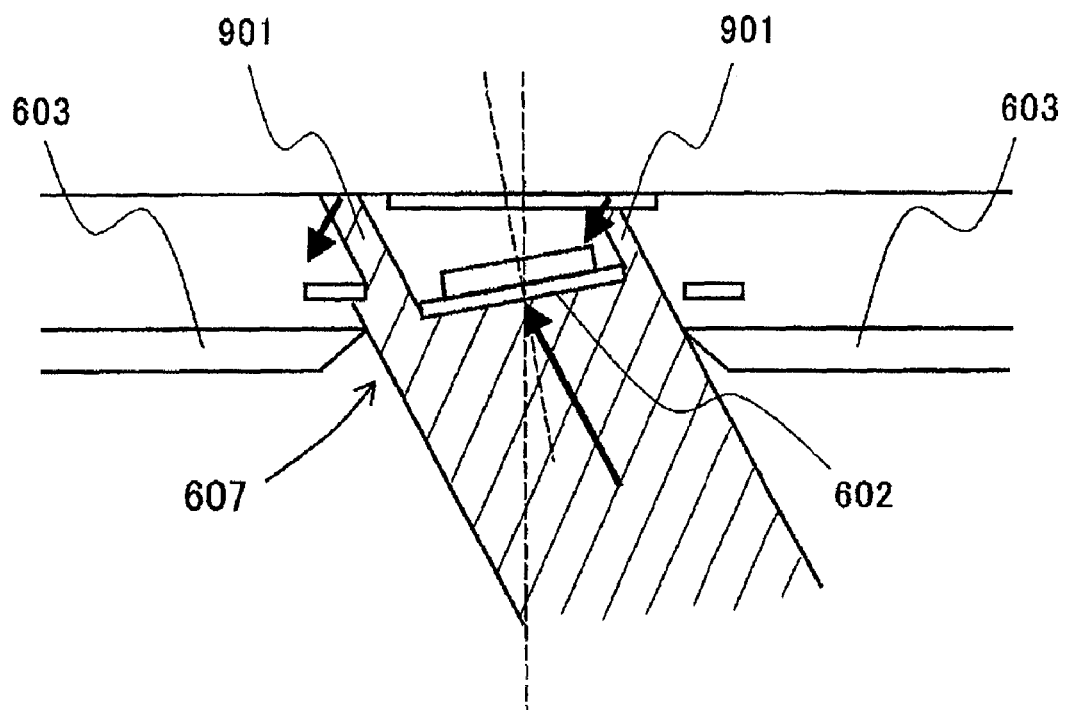
Figure 9B:
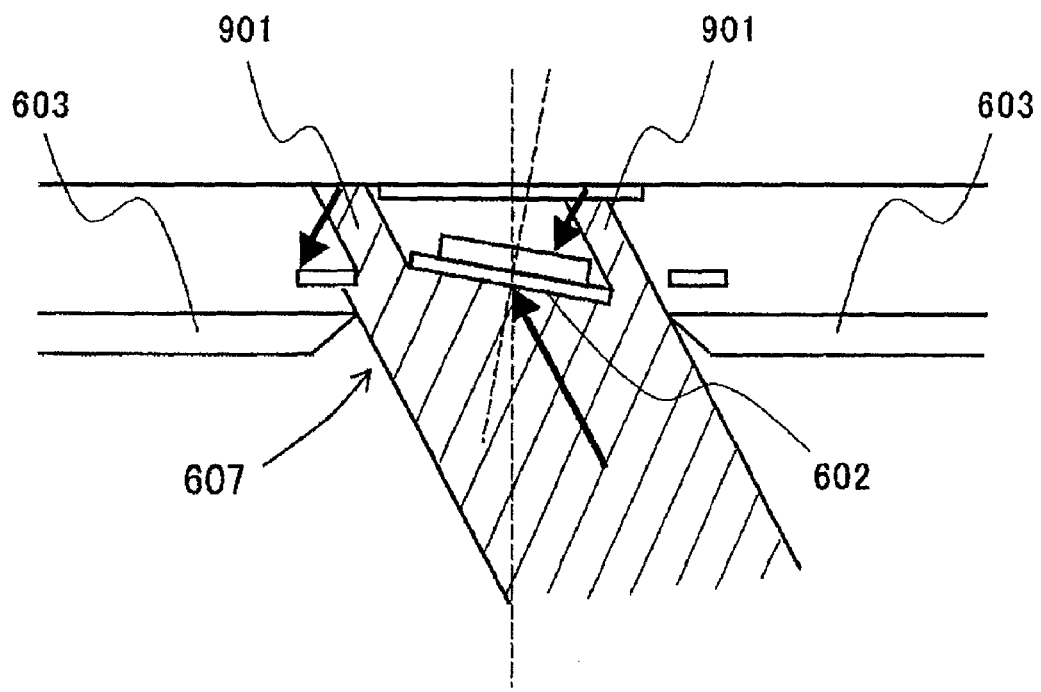

In the above-described example, the minimum aperture width (2.21 mm) of the aperture 607 is greater than the width (1.5 mm) of the reflecting surface 602 in the direction orthogonal to the swinging motion axis M. Therefore, of the incident luminous flux, a leakage light component 901 which does not impinge on the reflecting surface 602 is reflected by the members (the coil, the supporting base or the like) disposed behind the reflecting surface 602 as shown in FIGS. 9A and 9B respectively corresponding to FIGS. 8A and 8B. However, the reflected leakage light component is blocked by the back surface of the reflecting surface 602 and the reflecting-surface-side surface of the aperture stop plate 603, thereby being prevented from exiting from the aperture 607.

As described above, according to this embodiment, providing the aperture atop plate 603 in the optical deflector 601 enables facile positioning the incident luminous flux 604 entering toward the reflecting surface 602 and the reflecting surface 102. Further, this embodiment can prevent the unnecessary light component (leakage light component) that passes through the aperture 607 but does not impinge on the reflecting surface 602 from exiting from the aperture 607, thereby enabling prevention of generation of flare on a displayed image.

Furthermore, in this embodiment, the aperture rim of the aperture stop plate 603 has the tapered shape which makes the aperture width narrower as closer to the reflecting surface 602. This can suppress the incident luminous flux and emergent luminous flux from being blocked by the aperture rim, thereby enabling prevention of reduction of light use efficiency.

Embodiment 3

Figure 10:
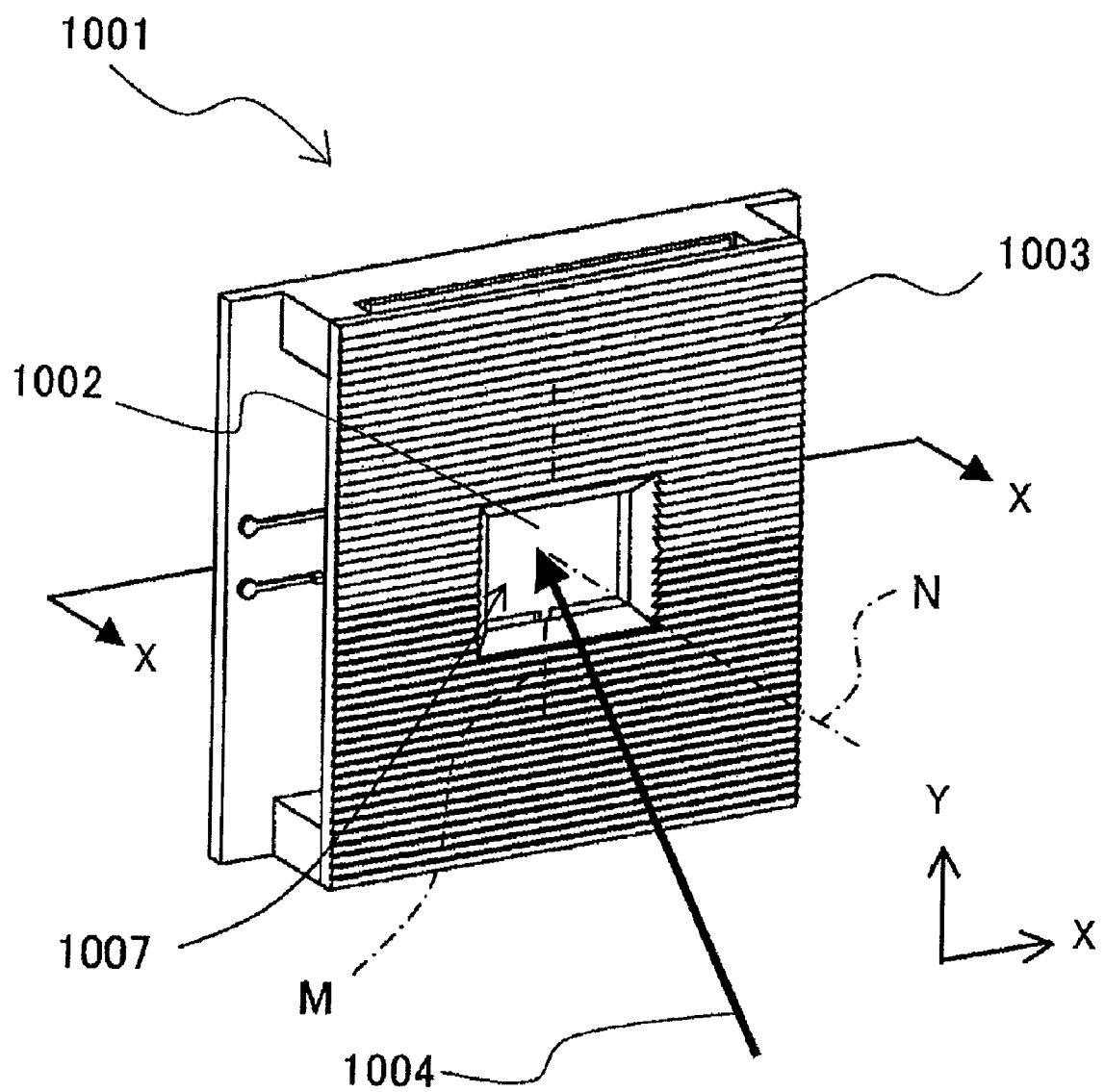
FIG. 10 is a perspective view showing an optical deflector which is Embodiment 3 of the present invention.

FIG. 10 shows an optical deflector which is Embodiment 3 of the present invention. The configuration of the optical deflector 1001 of this embodiment is basically the same as that of Embodiment 1. However, the optical deflector 1001 of this embodiment is different in the shape of a front surface (light-beam-incoming-side surface) of an aperture stop plate 1003 from that of Embodiment 1. Therefore, description in this embodiment will be mainly made of the shape of the aperture stop plate 1003.

FIG. 10 shows a state in which a light beam 1004 enters the optical deflector 1001 whose reflecting surface 1002 is in the neutral static state, as shown in FIG. 1 of Embodiment 1.

Figure 11:
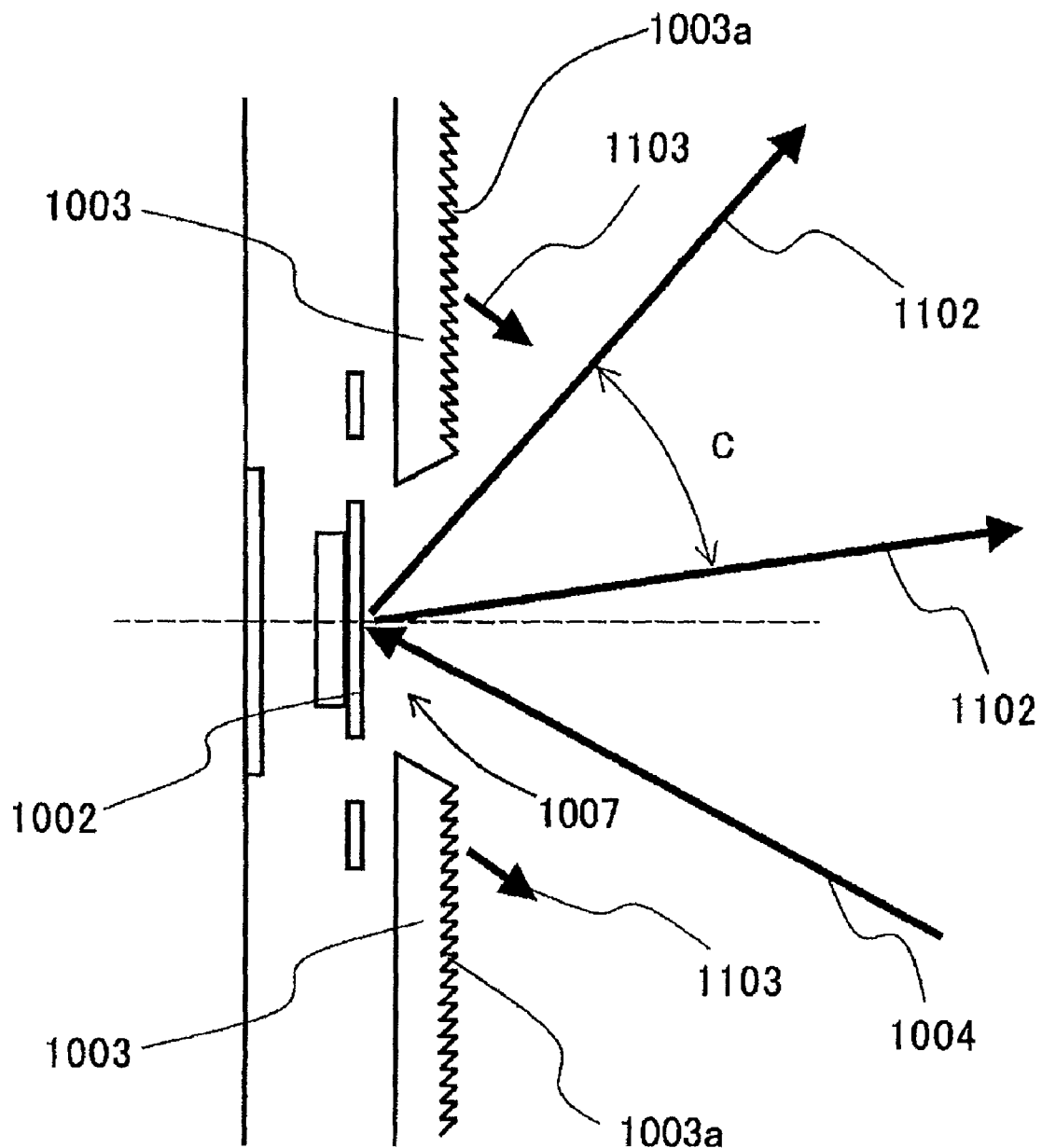
FIG. 11 is a sectional view showing the optical deflector of Embodiment 3, which is in a neutral static state.

FIG. 11 shows a cross-section of the optical deflector 1001 shown in FIG. 10, the cross-section being along an X-X line passing through the center of the reflecting surface 1002 and orthogonal to a swinging motion axis M of and a normal N to the reflecting surface 1002.

As shown in FIG. 11, the front surface 1003a of the aperture stop plate 1003 has a periodic shape which has a sawtooth cross-section when viewed from a Y-direction. Thereby, of an incident luminous flux 1004 from an unshown light source, a light beam 1103 which impinges on the front surface 1003a of the aperture stop plate 1003 (that is, an unnecessary light component which does not impinge on the reflecting surface 1002) is reflected in directions different from the following direction C.

FIG. 11 shows the reflecting surface 1002 in the neutral static state. However, a necessary light beam 1102 that is used for image display impinges on the swinging reflecting surface 1002 and then is reflected thereby within a range with an angle of C (outgoing angular range, hereinafter referred to as a reflection angular range), as shown in the figure.

On the other hand, the unnecessary light component 1103 impinging on the front surface 1003a of the aperture stop plate 1003 is reflected in directions outside of the reflection angular range with the above-described angle C, thereby enabling prevention of generation of flare due to the unnecessary light component 1103 on a displayed image.

As described above, this embodiment can prevent the unnecessary light component 1103 that does not impinge on the reflecting surface 1002 and is reflected by the front surface 1003a of the aperture stop plate 1003 from proceeding into the reflection angular range in which the necessary light beam 1102 is reflected by the reflecting surface 1002.

The shape of the front surface 1003a of the aperture stop plate 1003 is not limited to that described above, and any shape can be employed as long as it can prevent the unnecessary light component which does not impinge on the reflecting surface 1002 from proceeding into the reflection angular range of the necessary light beam.

Further, the shape of the front surface 1003a may be a shape which reflects part of the unnecessary light component into the reflection angular range of the necessary light beam, as long as it can reflect most of the unnecessary light component to the outside of the reflection angular range of the necessary light beam to prevent the part of the unnecessary light component from generating noticeable flare.

Embodiment 4

Figure 12:
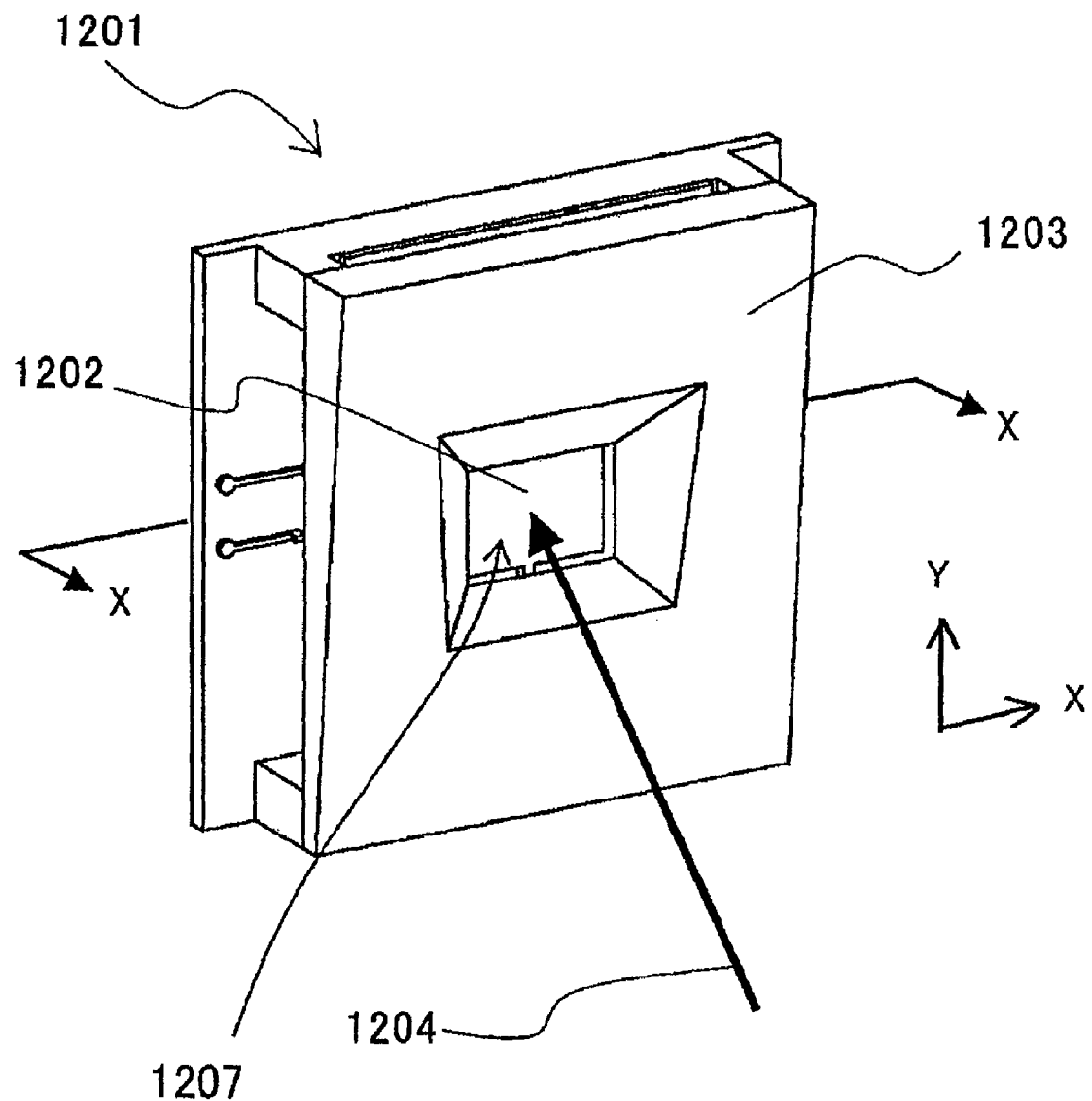
FIG. 12 is a perspective view showing an optical deflector which is Embodiment 4 of the present invention.

FIG. 12 shows an optical deflector which is Embodiment 4 of the present invention. The configuration of the optical deflector 1201 of this embodiment is basically the same as that of Embodiment 1. However, the optical deflector 1201 of this embodiment is different in the shape of an aperture stop plate 1203 from that of Embodiment 1. Therefore, description in this embodiment will be mainly made of the shape of the aperture stop plate 1203.

FIG. 12 shows a state in which a light beam 1204 enters the optical deflector 1201 whose reflecting surface 1202 is in the neutral static state, as shown in FIG. 1 of Embodiment 1.

Figure 13:
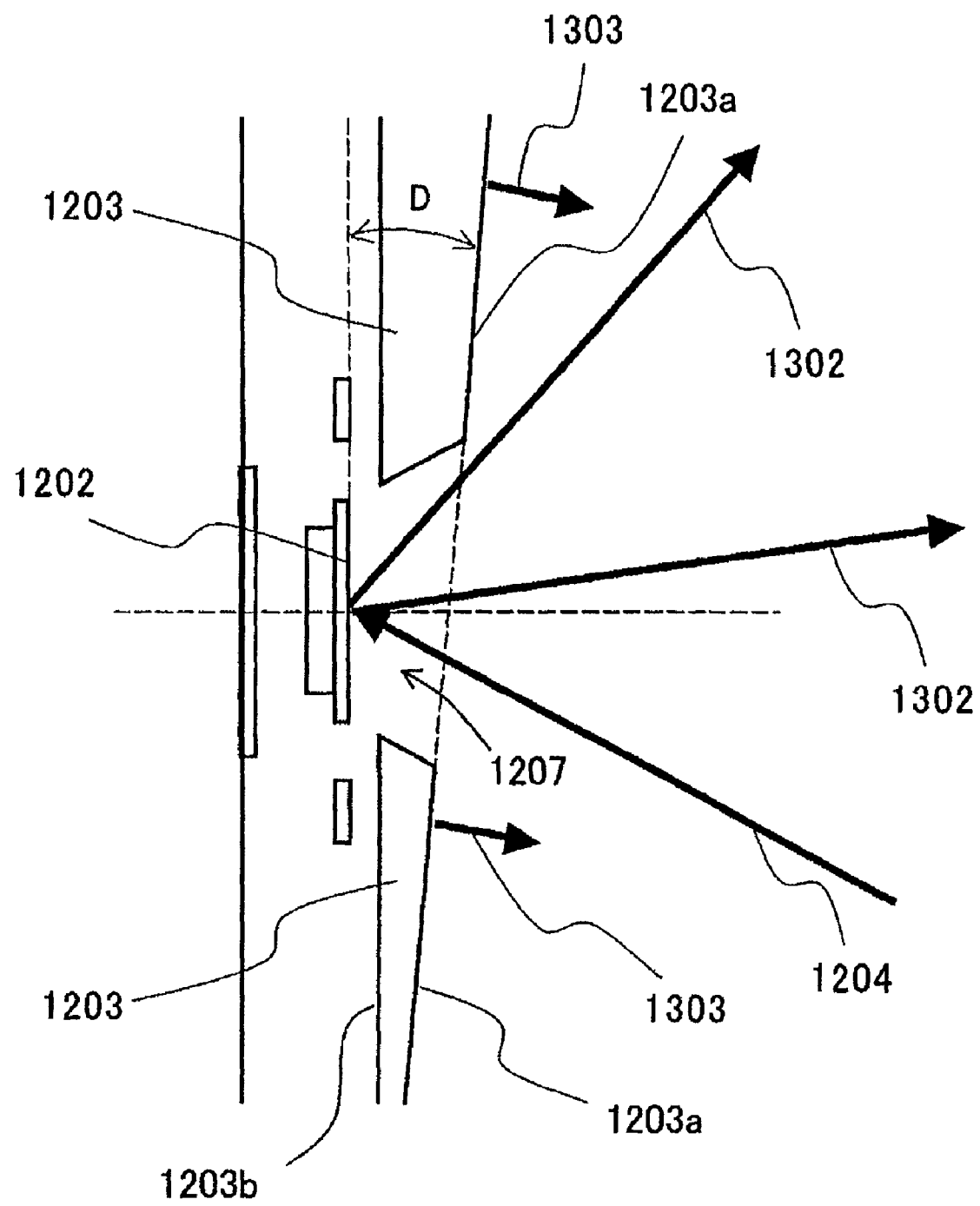
FIG. 13 is a sectional view showing the optical deflector of Embodiment 4, which is in a neutral static state.

FIG. 13 shows a cross-section of the optical deflector 1201 shown in FIG. 12, the cross-section being along an X-X line passing through the center of the reflecting surface 1202 and orthogonal to a swinging motion axis M of and a normal N to the reflecting surface 1202.

As shown in FIG. 13, a front surface (light-beam-incoming-side surface) 1203a of the aperture stop plate 1203 has an inclination angle of D to the reflecting surface 1202 in the neutral static state and a reflecting-surface (portion)-side surface 1203b of the aperture stop plate 1203. That is, the front surface 1203a of the aperture stop plate 1203 is formed in nonparallel to the reflecting-surface-side surface 1203b.

It is preferable that the inclination angle D be larger than the maximum mechanical incline angle of the reflecting surface 1202. This can prevent an unnecessary light component 1303 reflected by the front surface 1203a of the aperture stop plate 1203 from being reflected in the same direction as that of a necessary light beam 1302 reflected by the reflecting surface 1202, thereby enabling prevention of generation of flare due to the unnecessary light component 1303 on a displayed image.

Tapered portions are formed at the aperture rim of the aperture stop plate 1203 having an aperture 1207, and their taper angles can be determined by the method described in Embodiments 1 and 2.

In FIG. 13, the front surface 1203a of the aperture stop plate 1203 is inclined such that the thickness of the aperture stop plate 1203 becomes thinner toward the light-beam-incoming side. However, the inclination direction of the front surface is not limited thereto.

As described above, this embodiment can prevent the unnecessary light component 1303 that does not impinge on the reflecting surface 1202 and is reflected by the front surface 1203a of the aperture stop plate 1203 from proceeding in the reflection direction of the necessary light beam 1302 that is reflected by the reflecting surface 1002.

Embodiment 5

Figure 14:
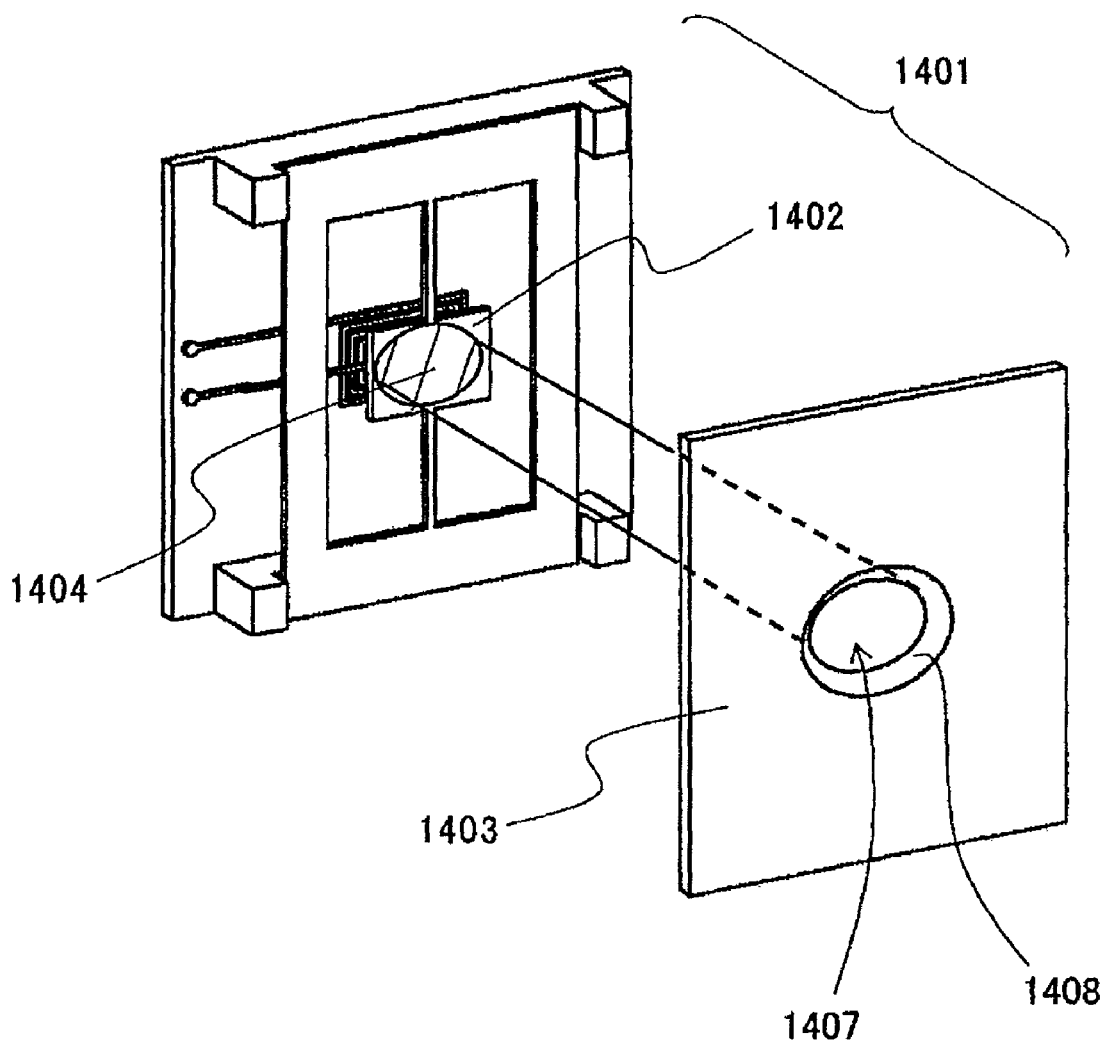
FIG. 14 is an exploded perspective view showing an optical deflector which is Embodiment 5 of the present invention.
Figure 15:
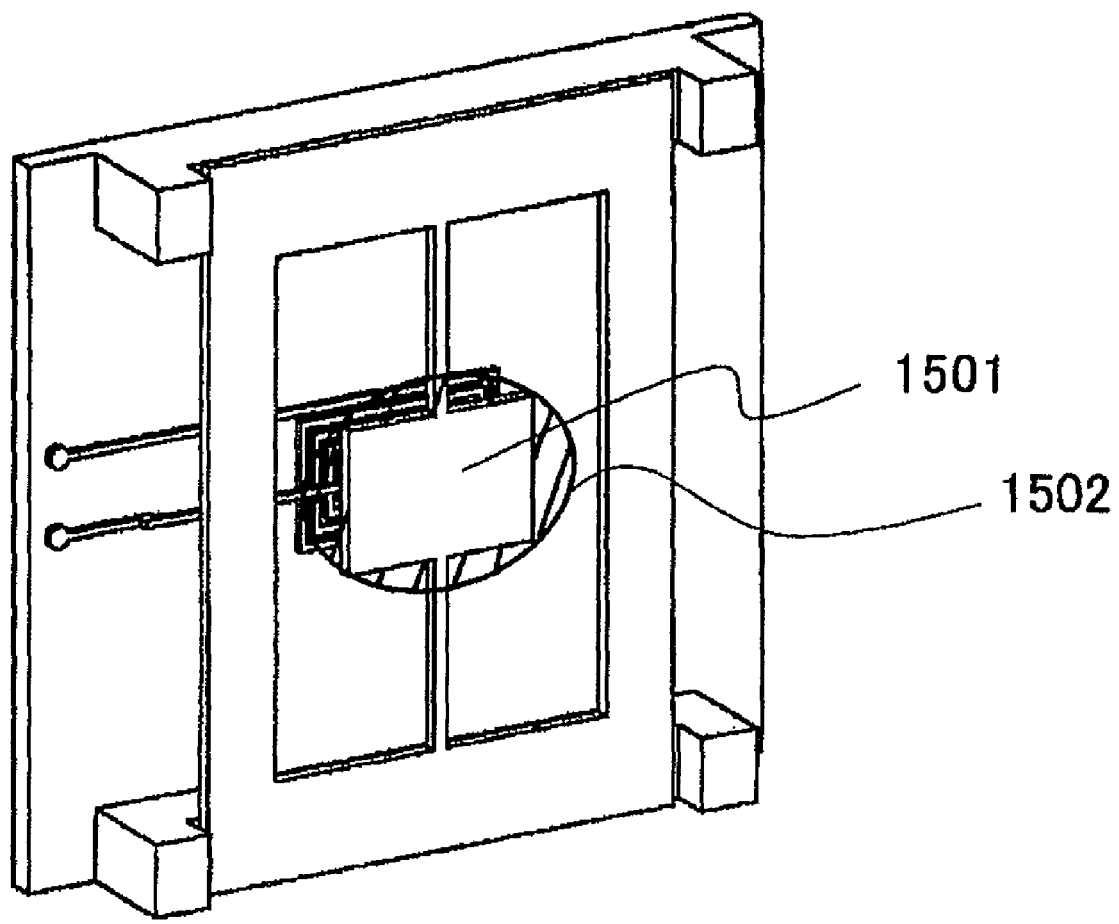
FIG. 15 is a perspective view showing a conventional optical deflector.
Figure 16:
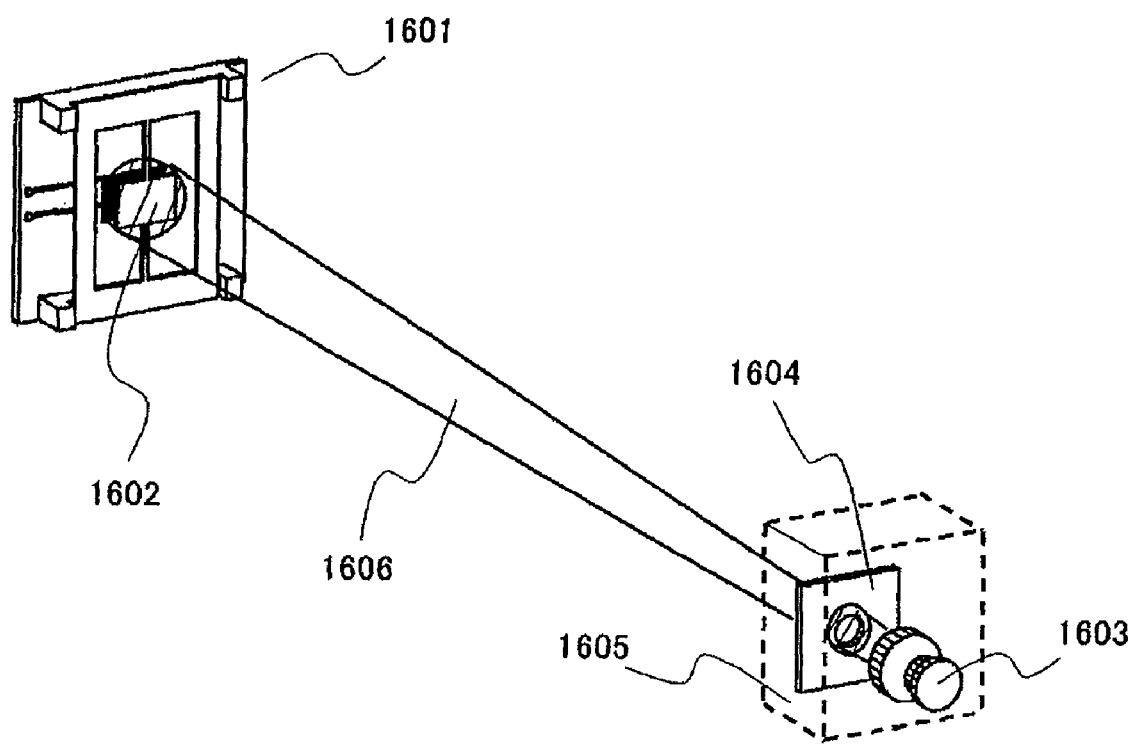
FIG. 16 is a figure for explaining a relationship between the conventional optical deflector and a light source.

FIG. 14 shows an optical deflector which is Embodiment 5 of the present invention. The configuration of the optical deflector 1401 of this embodiment is basically the same as that of Embodiment 1. However, the optical deflector 1401 of this embodiment is different in the shape of an aperture stop plate 1403 from that of Embodiment 1. Therefore, description in this embodiment will be mainly made of the shape of the aperture stop plate 1403. In addition, the taper angle of a tapered portion 1408 formed at an aperture rim of the aperture stop plate 1403 is determined in the same manner as that in Embodiment 1.

FIG. 14 shows a state in which a light beam 1404 enters the optical deflector 1401 whose reflecting surface 1402 is in the neutral static state, as shown in FIG. 1 of Embodiment 1.

The optical deflectors described in Embodiments 1 to 4 have a rectangular aperture formed in the aperture stop plate. However, in the optical deflector 1401 of this embodiment, the reflecting surface 1402 is formed in a rectangular shape, but an aperture 1407 of the aperture stop plate 1403 is formed in an elliptic shape or a circular shape, whose size is smaller than that of the reflecting surface 1402.

The aperture 1407 shapes the cross-section of an incoming light 1404 entering toward the reflecting surface 1402 into an elliptic shape or a circular shape. This causes an emergent luminous flux reflected by the optical deflector 1401 (reflecting surface 1402) to form a spot having a good shape on a scanned surface, which is effective to improve the quality of a displayed image.

According to this embodiment, it is possible to adequately set the shape of the aperture 1407 of the aperture stop plate 1403 in accordance with aims such as improvement of image quality, irrespective of the shape of the reflecting surface 1402 in the optical deflector 1401.

As described above, the optical deflector of each of Embodiments 1 to 5 can block with the aperture stop portion at least part of the light beam proceeding toward a region other than the reflecting portion among the incident luminous flux to the optical deflector. Therefore, even when the diameter of the incident luminous flux is larger than the reflecting portion or there is a displacement between the reflecting portion and the incident luminous flux, the optical deflector can reduce, among the light beam passing through the aperture, the unnecessary light component which is reflected by portions other than the reflecting portion and then exits from the aperture.

Further, in each of the embodiments, the aperture rim of the aperture stop portion has a shape which makes the aperture width narrower as closer to the reflecting portion. This can suppress the aperture rim of the aperture stop portion disposed close to the reflecting portion from blocking the incident luminous flux to the reflecting portion and the emergent luminous flux from the reflecting portion, which enables prevention of reduction of light use efficiency. In addition, this can prevent the aperture stop portion from limiting the maximum exit angle of the light beam from the deflector to be small.

Description was made of the optical deflector which deflects (scans) the light beam one-dimensionally in each of the above embodiments. However, alternative embodiments of the present invention may use an optical deflector which deflects a light beam two-dimensionally.

Moreover, description was made of the case of using the aperture stop plate as a separate member from the MEMS mirror including the substrate portion and the reflecting portion in each of the above embodiments. However, the aperture stop portion may form integrally with the MEMS mirror.

Furthermore, the present invention is not limited to these preferred embodiments and various variations and modifications may be made without departing from the scope of the present invention.

Furthermore, the present invention is not limited to these preferred embodiments and various variations and modifications may be made without departing from the scope of the present invention.

This application claims foreign priority benefits based on Japanese Patent Application No. 2006-227505, filed on Aug. 24, 2006, and which is hereby incorporated by reference herein in its entirety as if fully set forth herein.

What is claimed is:

1. An optical deflector comprising:
   a substrate portion;
   a reflecting surface which is swingable about a swinging motion axis with respect to the substrate portion, wherein the reflecting surface is swingable about the swinging motion axis from a neutral static state of the reflecting surface; and
   an aperture stop portion which includes an aperture and which blocks at least part of a light beam other than a light beam entering the aperture, among an incident luminous flux to the optical deflector, the aperture allowing passage of the light beam entering toward the reflecting surface and that of an emergent luminous flux reflected by the reflecting surface,
   wherein at least part of an aperture rim of the aperture stop portion has a tapered surface such that the width of the aperture becomes narrower from a light-beam-incoming side toward a reflecting surface side, and wherein an angle between the tapered surface and a central axis of the aperture is greater than a maximum exit angle between the emergent luminous flux reflected by the reflecting surface and the central axis of the aperture, and wherein the aperture stop portion has a front surface which is different from the tapered surface, the front surface being a light-beam-incoming side of the aperture stop portion, and the front surface being inclined with respect to the reflecting surface when the reflecting surface is in the neutral static state.

2. The optical deflector according to claim 1, wherein the light-beam-incoming side surface has a shape which reflects the light beam impinging thereon among the incident luminous flux in a direction different from an outgoing angular range of the emergent luminous flux reflected by the reflecting surface.

3. A light scanning apparatus comprising:
a light source; and
the optical deflector according to claim 1, which scans a light beam from the light source.

4. A scanning type image display apparatus comprising:
a light source; and
the optical deflector according to claim 1,
wherein the apparatus scans a light beam from the light source with the optical deflector to display an image.

5. An image display system comprising:
the scanning type image display apparatus according to claim 4; and
an image supply apparatus which supplies image information to the image display apparatus.

6. The optical deflector according to claim 1, wherein an inclination angle D of the inclined front surface is larger than a maximum swinging angle of the reflecting surface about its swinging motion axis.

7. The optical deflector of claim 1, wherein the front surface is inclined such that the aperture stop portion has a thicker end and a thinner end, and
wherein width of the aperture as measured at the front surface is wider towards the thicker end of the aperture stop portion than towards the thinner end thereof.

* * * * *